Nov. 1, 1966     W. T. RENTSCHLER     3,282,182
PHOTOGRAPHIC INTRA-LENS SHUTTER WITH SETTING MEMBERS FOR
DIAPHRAGM AND EXPOSURE TIME
Filed Sept. 15, 1964     2 Sheets-Sheet 1
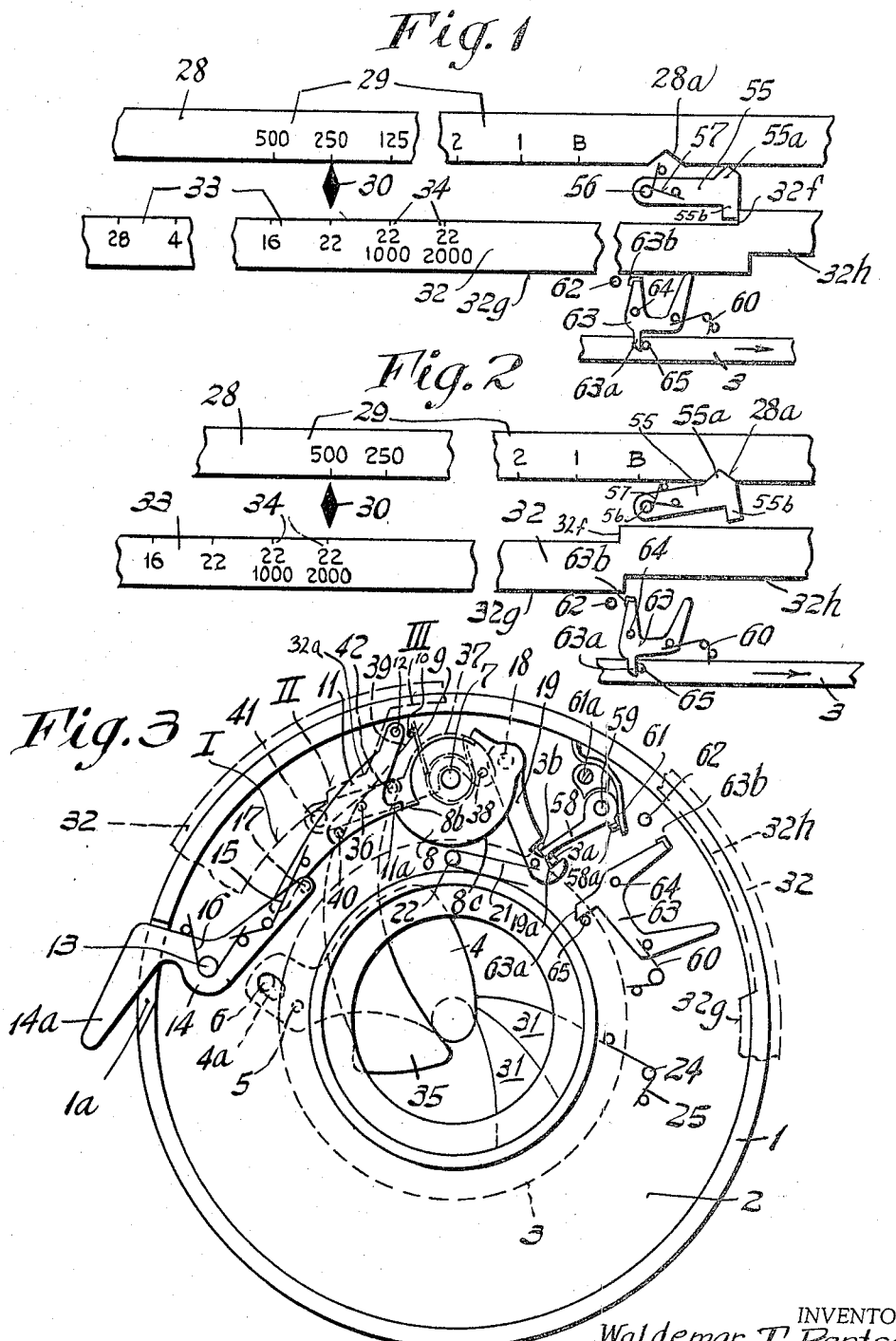
INVENTOR.
Waldemar T. Rentschler
BY
Arthur A. March
ATTORNEY

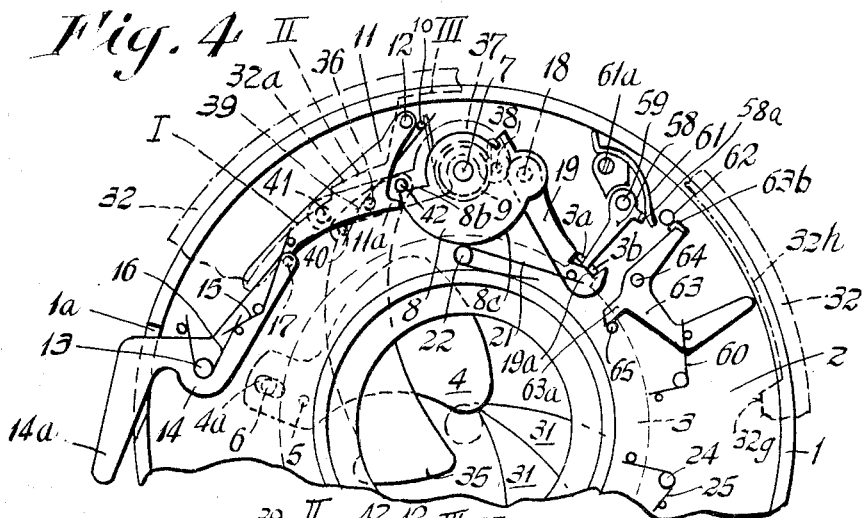
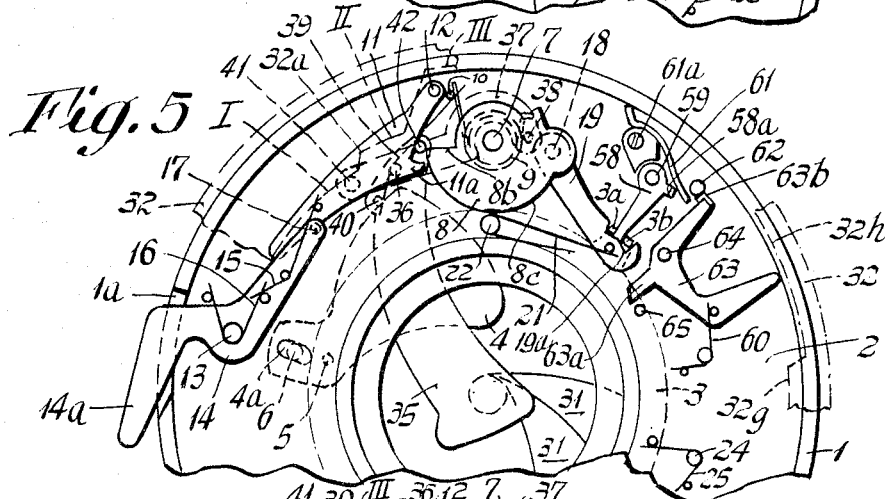
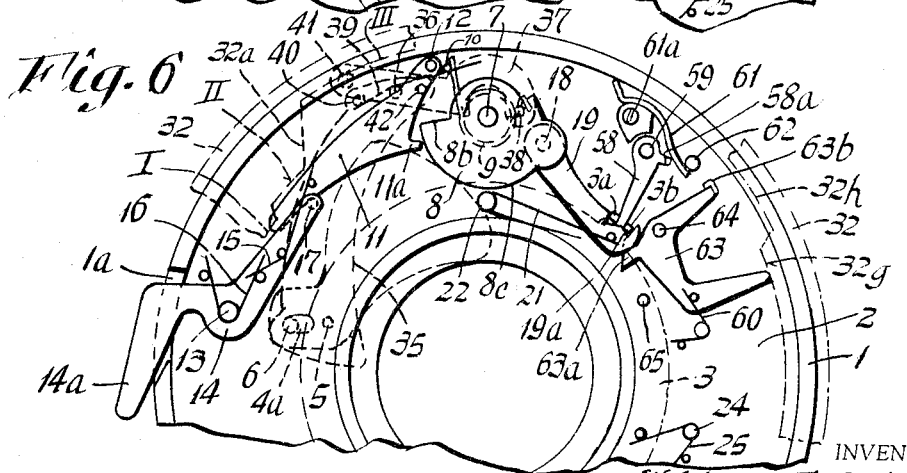

United States Patent Office 3,282,182
Patented Nov. 1, 1966

3,282,182
PHOTOGRAPHIC INTRA-LENS SHUTTER WITH SETTING MEMBERS FOR DIAPHRAGM AND EXPOSURE TIME
Waldemar T. Rentschler, Calmbach (Enz), Germany, assignor to Alfred Gauthier, G.m.b.H., Calmbach (Enz), Germany, a corporation of Germany
Filed Sept. 15, 1964, Ser. No. 396,696
Claims priority, application Germany, Sept. 17, 1963, G 38,706
2 Claims. (Cl. 95—11.5)

The present invention relates to a photographic shutter mechanism having a regular shutter blade and a special high-speed shutter blade and means connected to the diaphragm control to permit the special high-speed shutter blade to be actuated only when the diaphragm control has been set to an exposure value of an additional scale or exposure-value range which includes the value of the smallest diaphragm aperture. In particular, the invention relates to means associated with the foregoing shutter for actuating a photoflash lamp when the diaphragm control is set to the said additional exposure value to bring the high-speed shutter blade into operation.

The intra-lens photographic shutter mechanism with which the present invention is concerned has diaphragm and exposure time setting members, or controls, which may be set independently of each other to govern the diaphragm aperture size and the operating speed of the shutter blades, respectively. Exposure time control has a scale with shutter speed values thereon; the diaphragm control also has associated with it a scale giving various aperture values.

For the purpose of making exposures on highly sensitive film, which may be overexposed at even the highest normal shutter speed and the smallest diaphragm aperture, the shutter mechanism includes means connected to the diaphgram control to operate a separate high-speed shutter blade which is brought into operating position only when the diaphragm control is set to one of the additional exposure values with the smallest aperture size and very high speeds. With the diaphragm set for a very small aperture, it is not necessary to have a large shutter blade movement in order to uncover this small aperture completely and, hence, the special high-speed shutter blade does not need to move as far as the regular shutter blades, nor does it need to be as heavy and complex. These factors make it relatively easy to operate the special shutter blade at the very high speeds required to expose the high-speed film correctly.

It is one of the main objects of the present invention to improve the above defined intra-lens shutter in such a manner, that an electronic photoflash gun can be used both within the usual exposure value range and in the additional scale or exposure value range corresponding to extremely short exposure times. According to the present invention, the shutter for carrying out photoflash exposures is provided, in addition to the conventional X-contact switch, with an additional contact switch which becomes operative only when the diaphragm control is set to the additional exposure value range. The additional switch is controlled by the shutter blade drive and makes contact shortly before the smalles diaphragm aperture is opened by the shutter blades. This arrangement permits an electronic photoflash gun to be used under circumstances in which the shutter has been set at one of the extremely short exposure times of the additional exposure value range.

Another object of the invention is to provide an appropriate, functionally dependable embodiment of the additional contact switch comprising a fixed contact pin and a rotatable contact lever. Due to the action of a spring and the fact that the contact lever abuts against the shutter blade driving ring when the ring in is its starting position, the lever is influenced by a two-stepped cam of the diaphragm setting member in such a manner that it is able to execute the rotary motion required for establishing contact only upon the setting of one of the additional scale or exposure values. This arrangement ensures that the contact switch associated with the respective setting range always becomes operative automatically with the setting of the diaphragm setting member, i.e., without the assistance of the photographer.

An embodiment of the invention will be explained in the specification that follows by way of the accompanying drawings, in which:

FIG. 1 is a diagrammatic partial view of the controls for exposure time and diaphragm in connection with the additional flash contact switch. The controls are illustrated with the diaphragm setting member in the position in which the contact lever is locked;

FIG. 2 shows the same arrangement as FIG. 1 with the diaphragm setting member is a position in which the additional photoflash contact switch is released and operative;

FIG. 3 is a top view of a photographic intra-lens shutter, illustrating the device for obtaining extremely short exposure times, including the conventional X-contact switch and the additional photoflash contact switch, whose contact lever is released for pivoting by the diaphragm setting member;

FIG. 4 shows the same arrangement as FIG. 3 after release has been effected, in which case the shutter blade system of the shutter mechanism has just opened the preset smallest diaphragm aperture and the additional photoflash contact switch has established contact for the flash ignition;

FIG. 5 shows the shutter in a phase of motion in which the additional photoflash contact switch occupies the same position as in FIG. 4, while the shutter blades return again to the closed position.

FIG. 6 shows the same arrangement which is illustrated in FIGS. 3 to 5, showing another phase of the running down of the shutter, in which the shutter blade system is in its open position, while the device for obtaining extremely short exposure times as well as the additional photoflash contact switch are in inoperative.

The drawings show a photographic intra-lens shutter comprising a housing 1 with a base plate 2. A ring 3 rotatably mounted at the rear of the base plate 2 drives a plurality of shutter blades 4, only one of which is shown in the drawing for the sake of clarity. The shutter blades 4 are pivotally mounted on pins 5 on the driving ring 3 and are guided by slots 4a on fixed pins 6. A shaft 7 is rotatably mounted on the base plate 2, one end being rigidly attached to the driving disk 8 of the shutter in the conventional manner. The dividing disk 8 is acted upon by a coil spring 9 mounted on the shaft 7 and exerting a clockwise moment of rotation on the driving disk. When in cocked position, the driving disk 8 is held by arresting lever 11 mounted on a fixed pin 12. For this purpose, the arresting lever 11 comprises, at one end, an arm 11a which extends into the path of motion of a projection 8b of the driving disk 8. The other end lies in the path of motion of a shutter release 14, which is pivotally arranged on a fixed pin 13 and which has a finger piece 14a that projects outwardly through a slot 1a in the side wall of the shutter housing. A spring 15 acts on the arresting lever 11 tending to rotate the same counterclockwise and a spring 16 arranged on the pin 13 tends to rotate the shutter release 14 clockwise. The arresting lever 11 is pressed against a pin 17 on the shutter release 14 so that when the shutter release 14 is rotated counterclockwise, the pin 17 pivots the lever 11 against the action of the spring 15.

A driving pawl 19 is articulately mounted on a pin 18 on the driving disk 8. The free end of the pawl comprises coupling jaws 19a which embrace, in the usual manner, a lug 3a which is bent-off from the driving ring 3. A coil spring 21 is mounted on a fixed pin 22 to press against the driving pawl 19 in order to keep the coupling jaws 19a in engagement with the lug 3a.

When the above-described driving mechanism moves out of the cocked position shown in FIG. 3, the ring 3, which drives the shutter blades 4, first rotates clockwise, causing the shutter blades to pivot about the fixed pin 6 until they reach their open position. The further running-down motion of the driving disk 8 causes the reversal of the motion of the driving pawl 19, initiating the return motion of the ring 3. The shutter blades 4 are thus returned to the closed position. Upon re-cocking of the driving disk 8, which may be effected by actuating the film transport device, the driving pawl 19 slides along the lower surface of the lug 3a with the latter disengaged from the jaws 19a. The connection between the jaws 19a of the driving pawl 19, and the driving ring, is re-established only at the end of the cocking process by the action of the spring 21. Thus, the driving ring 3 is not influenced during the cocking process and therefore remains stationary under the pressure of a coil spring 25 mounted on a fixed pin 24.

A conventional exposure time escapement mechanism may also be arranged on the base plate 2, but is not illustrated in the drawing for the sake of clarity. It co-operates with the driving disk 8 and relays, to a greater or lesser degree, the running down of the driving disk while the shutter blades 4 are open. The setting of the escapement mechanism for different exposure times is effected by an exposure time, or shutter speed, control 28 (shown only partially in FIGS. 1 and 2). In the embodiment illustrated, the shutter speed control 28 is shown as a rotatably mounted ring, which carries an exposure time scale 29 comprising exposure time values ranging from 1 sec. to 1/500 sec., as well as a symbol "B" designed to be used for carrying out B exposures. A reference mark 30 arranged on the circumference of the side wall of the shutter housing is used to set the exposure time values.

The above-described shutter arrangement also includes an iris diaphragm settable at different aperture widths and comprising lamellae 31, indicated diagrammatically only in FIGS. 3 to 5. A control 32 shown here as a ring serves to set the lamellae 31, and is illustrated diagrammatically only in FIGS. 1 and 2. A diaphragm scale 33 comprising aperture values from "2.8" to "22" is provided on the control 32 to permit the lamellae 31 to be set to any value indicated on the scale 32 by the fixed setting mark 30. As a result of the aforementioned time and diaphragm setting ranges, the shutter mechanism comprises an exposure value setting range including the values from "3" to "18."

Supplementing the generally used exposure value setting range 33, is another setting range 34 which follows the diaphragm value "22," which is the smallest diaphragm aperture size, on the control 32. Within this range 34 the diaphragm remains set at the value "22," but a device is simultaneously connected for the purpose of obtaining extremely short exposure times (1/1000 sec. and 1/2000 sec.), not contained in the exposure time scale 29 of the exposure time setting member 28.

This device, which produces short exposure times, or high shutter speeds, is illustrated in FIGS. 3 to 6 and comprises an additional outside covering blade 35 associated with the shutter blades 4 of the intra-lens shutter. Upon setting the diaphragm control 32 at a pair of time/diaphragm values contained in the exposure value setting range 34, the covering blade 35 covers the smallest diaphragm aperture opened by the shutter blades 4 during the running down of the shutter, before the shutter blades 4 have again reached their closed position. For this purpose, the cover blade 35 may be pivotally mounted on a pin 36 which, in turn, is mounted on a one-armed lever 37 rotatably mounted on a fixed pin 38. One end of a coil spring 39 on the pin 36 abuts against the fixed pin 10, while the other end engages a pin 40 of the covering blade 35. The spring tends to keep the cover blade 35 and its carrier lever 37 in the position shown in FIG. 3 by imparting a clockwise rotational tendency thereto. This causes the pin 40 of the cover blade 35 to engage the lever 37, while a pin 41 on the latter is pressed against a control edge 32a of the diaphragm control 32.

As is apparent from FIGS. 3 to 6, the control edge 32a comprises steps I, II and III. Step I, which is opposite the pin 41 of the lever 37, is associated with the exposure time 1/2000 sec. of the setting range 34, and step II is associated with the exposure 1/1000 sec. of the same scale 34. Step III becomes operative when the diaphragm setting member 32 is set at one of the diaphragm values of the scale 33.

The covering blade 35 is driven by the disk 8 of the shutter mechanism by way of a projection 8b that engages a pin 42 arranged on the covering blade 35. The setting of the exposure times 1/2000 sec. or 1/1000 sec., which are associated with the steps I and II of the control edge 32a, causes the covering blade 35 to occupy a position in which the pin 42 is located in the path of motion of the projection 8b of the driving disk 8. If, while the covering blade 35 is set in this position, the previously cocked disk 8 is released for running down by actuation of the release lever 14, the shutter blades 4 are moved to their open position by means of both the driving pawl 19 and the ring 3. After the diaphragm aperture corresponding to the diaphragm value "22" has been opened by the shutter blades 4, i.e., at a moment at which the shutter blades have just left the closed position, the projection 8b of the driving disk 8 impinges on the pin 42 of the covering blade 35. The latter is moved from the starting position shown in FIGS. 3 and 4 to the position illustrated in FIG. 5, thus closing prematurely the diaphragm aperture opened by the shutter blades. The covering blade 35 is held in its covering position by the engagement of pin 42 with the arcuate outer edge 8c of the driving disk 8 by the force of the spring 39.

In the setting position of the diaphragm control 32 which is associated with the pair of time/diaphragm values "1/2000 sec."/f:"22", illustrated in FIGS. 3 to 5, the pin 41 of the lever 37 which carries the covering blade 35, engages the step I of the control edge 32a. This causes the covering blade 35 to be moved from its starting position almost to the diaphragm aperture. After release of the shutter has been effected, only a very small counter-clockwise pivoting motion of the covering blade 35 is required to close again the diaphragm aperture that had been uncovered by the shutter blades 4.

On the other hand, if the pair of time/diaphragm values "1/1000 sec."/f:"22" is set by means of the diaphragm setting member, the pin 41 engages the step II of the control edge 32a. This causes the covering blade 35 to be displaced to the left from the starting position illustrated in FIGS. 3 and 4. Consequently, the covering blade 35 must travel a somewhat longer path until it reaches its covering position. This means that the covering of the diaphragm aperture takes place at a slightly later moment than when the diaphragm control 32 is set at step I.

Within the setting range of the diaphragm control 32, as defined by the diaphragm scale 33, the pin 41 of the lever 37 engages the step III of the control edge 32a. As illustrated in FIG. 6, the covering blade 35 now occupies a position outside of the exposure aperture of the intra-lens shutter. The pin 42 is shifted out of the path of motion of the projection 8b of the driving disk 8, so that the latter, when running down, does not actuate the covering blade 35.

In order to avoid overexposures in photographic cameras which are provided with a built-in exposure meter, and which work according to the resetting principle, it is expedient to arrange a locking device between the two controls 28 and 32 for exposure time and diaphragm. The locking device might be arranged so that the diaphragm control 32 can be set at the additional exposure value setting range 34 only if the shutter speed control 28 is set at the shortest time value contained in the exposure time scale 29, for example, at the value 1/500 sec. The locking device may be an arresting lever 55 which is rotatably positioned on a fixed pin or pivot 56 as illustrated in FIGS. 1 and 2. A coil spring 57 may be associated with the arresting lever 55 tending to rotate the same in a counterclockwise direction. The arresting lever 55 may be provided with a projection 55a at one end, as well as with a stop 55b. The projection 55a cooperates with a notch 28a provided on the shutter speed control 28, while the stop 55b cooperates with a stop edge 32f developed on the diaphragm control 32. In addition, the arrangement is such that the projection 55a of the arresting lever 55 is able to enter the notch 28a only when the exposure time setting member 28 is set at the value 1/500 sec. As is apparent from FIG. 2, the displacement imparted to the stop 55a when it enters notch 28a, permits the diaphragm control 32 to be set at the additional exposure value range 34. Such a setting motion of the diaphragm control 32 is not possible when the exposure time control 28 is set at a value below 1/500 sec. In that case, the stop 55b is located in the path of motion of the stop edge 32f of the diaphragm control 32.

In order to be able to use electronic photoflash equipment in the above-described shutter arrangement, a contact switch is provided which sets off the photoflash gun a short time prior to the opening of the diaphragm aperture. The contact switch operates the gun even when the shutter is set at an exposure value corresponding to an extremely short exposure time, in which the diaphragm aperture is closed again by the shutter blade 35 immediately after having been opened. The contact switch may be employed with the conventional X-contact switch of the intra-lens shutter which becomes operative upon setting the exposure times contained in the scale 29 of the exposure time setting member 28. The X-contact switch, which closes the ignition circuit of the photoflash gun at the moment at which the shutter opening is uncovered completely by the shutter blades 4, may comprise a one-armed actuating lever 58 rotatably mounted on the pin 59 on the base plate 2 and engaging a correspondingly shaped opening or recess 3b on the upwardly bent lug 3a of the shutter blade driving ring 3. The actuating lever 58 comprises a bent-off lug 58a, by means of which the lever cooperates with a contact spring 61 fixed to the base plate 2 by a screw 61a. Also located in the range of motion of the contact spring 61 is a contact pin 62 fixed to the base plate 2 in such a position that, after the shutter has been released, the contact spring 61 is urged outward by the actuating lever 58. The lever 58 is in engagement with the shutter blade driving ring 3 and comes into engagement with the fixed contact pin 62 at the moment at which the shutter blades 4 fully uncover the exposure aperture.

The additional contact switch, which becomes operative when the extremely short exposure times 1/1000 sec. and 1/2000 sec. are set, includes a contact lever 63 rotatably mounted on a pin 64 and acted upon by a spring 60 which tends to rotate the lever in the direction of the fixed contact pin 62. In the starting position of the shutter blade driving ring 3, this rotation is prevented by a projection 63a of the contact lever 63, which engages a pin 65 of the shutter blade driving ring 3.

After the shutter has been released, the shutter blade driving ring 3 rotates clockwise with respect to FIG. 3. The contact lever 63 is therefore influenced by the action of the spring 60, until the bent-off lug 63b impinges on the fixed contact pin 62, thereby closing the ignition circuit of the photoflash gun. Contact is established at a moment at which the shutter blades 4 have not quite opened the smallest diaphragm aperture "f:22" (see FIG. 4). The effect is that the radiation maximum of the electronic photoflash gun, which operates practically without delay, exactly coincides with that phase of the running down of the shutter in which the aperture formed by the diaphragm lamellae 31 is opened by the shutter blades 4, but has not yet been covered again by the covering blade 35.

Since the contact switch 62, 63 must become operative only when extremely short exposure times are set, the contact lever 63 is arrested in the starting position, in order to avoid faulty exposures, whenever the diaphragm control 32 is set at a diaphragm value on the scale 33. See FIGS. 1 and 6. This purpose is achieved by a two-stepped cam 32g, 32h, which is developed on the diaphragm control 32 and is arranged in such a manner as to permit rotary motion of the contact lever 63 only when the diaphragm control 32 is set at the additional scale or exposure value range 34, as illustrated in FIGS. 2 to 5.

It will be understood that while the invention has been described in specific detail, variations and modifications may be made without departing from the scope of the invention as determined by the following claims.

What is claimed is:

1. A photographic shutter mechanism comprising a main shutter blade; a shutter driving mechanism; a control connected thereto to govern the operating speed thereof; a diaphragm iris capable of being set at different aperture sizes; a diaphragm control connected to said iris to control the aperture size thereof; said diaphragm control being associated to a normal scale of diaphragm values and at least one additional exposure value corresponding to the smallest diaphragm aperture size and an extremely short exposure time; an additional high-speed shutter blade; means connecting said high-speed shutter blade to said diaphragm control to place said high-speed shutter blade adjacent to the aperture in said iris only when said diaphragm control is set to a value of the additional scale respective exposure-value range; a shutter release; means to actuate said high-speed shutter blade when said shutter release is operated and only when said diaphragm control is set to the additional scale respective exposure-value range; a first contact switch connected to said shutter drive mechanism to be actuated thereby; and a second switch connected to said shutter driving mechanism only when the diaphragm control is set to the additional scale respective exposure-value range to make contact shortly before the smallest diaphragm aperture is uncovered.

2. A photographic shutter mechanism comprising a main shutter blade; a shutter driving mechanism; a control connected thereto to govern the operating speed thereof; a diaphragm iris capable of being set at different aperture sizes; a diaphragm control connected to said iris to control the aperture size thereof and having a range of positions corresponding to different aperture settings of said iris and at least one additional position corresponding to substantially the smallest aperture and a very short exposure time; a cam attached to said diaphragm control to be operated thereby; an additional high-speed shutter blade; means connecting said high-speed shutter blade to said diaphragm control to place said high-speed shutter blade adjacent to the aperture in said iris only when said diaphragm control is set to said additional position; a shutter release; means to actuate said high-speed shutter blade when said shutter release is operated and only when said diaphragm control has been set to said additional position; a first contact switch connected to said shutter driving mechanism to be actuated thereby; a second switch comprising a fixed contact pin, a contact lever, and a spring pressing said contact lever against said shutter driving mechanism when the latter is in its starting position, said contact lever being controlled by said cam to connect with said contact pin shortly before the smallest diaphragm aperture is uncovered only when said diaphragm control is set to its additional position.

References Cited by the Examiner
UNITED STATES PATENTS 2,231,094  2/1941  Seifert _____ 95—63

JOHN M. HORAN, *Primary Examiner.*